J. E. JONES.
PIPE OR SHAFT HANGER.
APPLICATION FILED JAN. 31, 1913.

1,075,356.

Patented Oct. 14, 1913.

WITNESSES
Roy E Fryar.
R. E. Randle.

James E Jones
INVENTOR;
By Robert W Randle
ATTORNEY.

UNITED STATES PATENT OFFICE.

JAMES E. JONES, OF RICHMOND, INDIANA.

PIPE OR SHAFT HANGER.

1,075,356.   Specification of Letters Patent.   Patented Oct. 14, 1913.

Application filed January 31, 1913. Serial No. 745,337.

*To all whom it may concern:*

Be it known that I, JAMES E. JONES, a citizen of the United States, residing in Richmond, in the county of Wayne and State of Indiana, have invented certain new and useful Improvements in Pipe or Shaft Hangers, of which the following is a full, clear, and comprehensive specification and exposition, being such as will enable others to make and use the same with exactitute.

My present invention relates to hangers for either stationary, revolving, or rotating pipes or shafts, and the object thereof, broadly speaking, is to provide a pipe or shaft hanger which will be positive in action, strong and durable in construction, easily assembled and placed in position, and which can be manufactured and sold at a comparatively low price.

A more specific object is to provide a pipe or shaft hanger adapted to be adjusted to accommodate the distance the pipe or shaft is to be located from the object by or to which it is suspended.

Other objects and particular advantages of this invention will suggest themselves to the mechanic, and the particular feature of the invention will be brought out in the following specification.

The preferred manner for the accomplishment of my invention in a practical manner is shown in the accompanying one-sheet of drawings, in which—

Figures 1, 2:
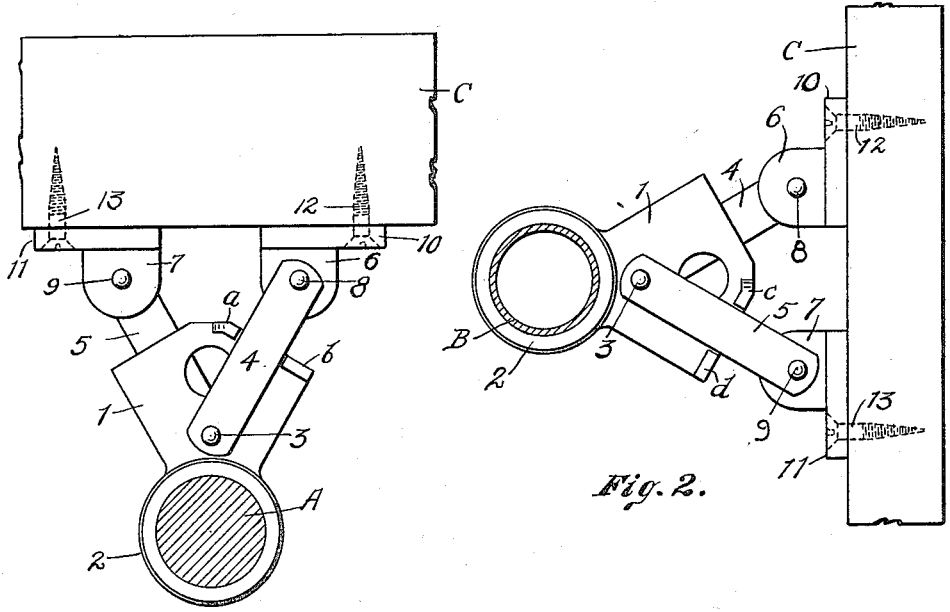
Figure 3:
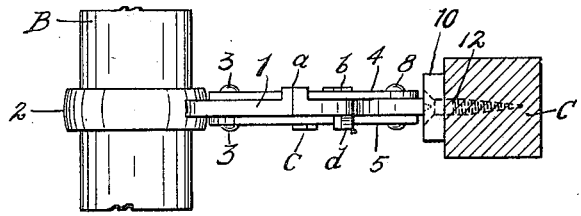
Figure 4:
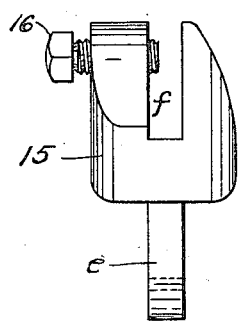
Figure 5:
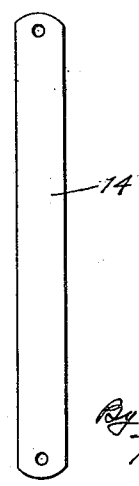

Figure 1 shows one side of my invention in elevation as suspended from a joist or beam. Fig. 2 shows the other side of my invention as extending out from the timber or the like to which it is attached. Fig. 3 is an edge view of the invention. Fig. 4 shows a modfied form of foot from that shown in the other views, and Fig. 5 shows a substitute leg, differing only in length from that shown in the other views.

Similar indices denote like parts throughout the several views.

In the drawings letter A denotes a shaft to be supported. Letter B denotes a pipe to be supported. And letter C denotes the timber, to this the device is to be attached.

The invention proper comprises the body 1 which is substantially flat; and extending out from the body is the head 2 which is in the nature of a ring or band having a round aperture therethrough at right angles to the body 1, said aperture being of a size to receive therein the pipe B or the shaft A, as shown, and same extends at right-angles to said body 1. Said body and head are formed integral with each other,—the two making a single casting. The shape of the body 1 is that of a pentagon, one of the five sides being merged into the periphery of the head 2 from which it flares outward, the two outer sides being at right-angles to their respective flaring sides, and the juncture, or apex, of the two outer sides with each other is truncated on a line parallel with the shaft or pipe. Extending forward in an axial direction from the edge of one of said outer sides are the lugs $a$ and $b$; and in same manner on the face of the other side are the lugs $c$ and $d$. The members of each pair of said lugs are spaced apart to form a notch for the legs hereinafter referred to.

Extending through the body 1, near its juncture with the head 2, is a rivet 3 by which one end of each of the legs 4 and 5 are secured flat against the two opposite faces of the body 1. Said legs flare out from said rivet parallel with the respective flaring sides of the body. The leg 4 fits snugly between the lugs $a$ and $b$, while the leg 5 in like manner fits between the lugs $c$ and $d$, from which it is apparent that said legs are thus rigidly secured and are prevented from turning on the rivet 3.

Numerals 6 and 7 denote the two feet. The foot 6 is secured to the leg 4 by the rivet 8, and the foot 7 is secured to the leg 5 by the rivet 9. Said feet 6 and 7 usually extend parallel to each other although they may be adjusted to stand at various angles when desired. Each of said feet 6 and 7 is provided with a toe, 10 and 11 respectively, through each of which is formed an aperture for the respective screws 12 and 13. Said feet may be rigidly secured to the timber C in any well known manner as desired, and by which the device is held securely in position, the timber C being the supporting element in this instance. If, for instance, it be desired to locate the shaft or pipe at a greater distance from the supporting element C, than that shown, then one has only to substitute longer legs in place of the legs 4 and 5, as for instance the leg 14 shown in Fig. 5, which, as is apparent, will cause the feet to be located farther apart than that shown thereby increasing the bracing power of the device. The distance at which the feet are located apart increases in proper ratio to the length of the legs employed.

Various kinds of feet may be employed, in place of the feet 6 and 7, depending upon the conditions and the form of the supporting element to be attached to. For instance, in place of the feet 6 and 7 slotted feet may be employed as that indicated by numeral 15 in Fig. 4, which is in the nature of a clamp having a tongue e through which is an aperture whereby it may be connected to one of the legs 4, 5 or 15 as by a rivet 8 or 9. The slot f being adapted to stride a bar or the like to which the device may be secured by the set-screw 16.

I desire that it be understood that various changes may be made in the several details of construction from that herein shown and described without departing from the spirit of my invention or sacrificing any of the advantages thereof.

Having now fully shown and described my invention, what I claim and desire to secure by Letters Patent of the United States, is—

A pipe or shaft hanger comprising a pentagon-shaped body, a ring-like head adapted to surround a pipe or shaft and formed integral with the body, a pair of changeable legs each contacting with an opposite face of the body and each secured thereto at their inner ends by a rivet or the like common to both legs, lugs formed on the body to prevent the legs from turning on said rivet or the like, a foot attached to the outer end of each leg, and means for attaching each foot to a supporting element.

In testimony whereof I have hereunto subscribed my name to this specification in the presence of two subscribing witnesses.

JAMES E. JONES.

Witnesses:
E. L. SANDERSON,
R. E. RANDLE.

---

Copies of this patent may be obtained for five cents each, by addressing the "Commissioner of Patents, Washington, D. C."